US008047002B2

(12) United States Patent  
Pieussergues et al.

(10) Patent No.: US 8,047,002 B2  
(45) Date of Patent: Nov. 1, 2011

(54) ANNULAR COMBUSTION CHAMBER OF A GAS TURBINE ENGINE

(75) Inventors: Christophe Pieussergues, Nangis (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 542 days.

(21) Appl. No.: 12/259,714

(22) Filed: Oct. 28, 2008

(65) Prior Publication Data

US 2009/0107148 A1  Apr. 30, 2009

(30) Foreign Application Priority Data

Oct. 31, 2007 (FR) ..................................... 07 07687

(51) Int. Cl.  
*F02C 1/00* (2006.01)

(52) U.S. Cl. .............................. 60/739; 60/746; 60/741

(58) Field of Classification Search ................... 60/739, 60/741, 746, 752, 39.23, 39.27, 734, 782, 60/785, 796–800  
See application file for complete search history.

(56) References Cited

U.S. PATENT DOCUMENTS

| | | | | |
|---|---|---|---|---|
| 2,757,961 A | * | 8/1956 | Nims ............................... | 239/76 |
| 3,978,658 A | * | 9/1976 | Forbes et al. ................ | 60/39.27 |
| 4,226,365 A | * | 10/1980 | Norris et al. ..................... | 239/66 |
| 4,491,272 A | | 1/1985 | Bradley et al. | |
| 4,742,685 A | * | 5/1988 | Halvorsen et al. .............. | 60/739 |
| 5,211,003 A | | 5/1993 | Samuel | |
| 5,257,502 A | * | 11/1993 | Napoli ............................ | 60/739 |
| 5,544,478 A | | 8/1996 | Shu et al. | |
| 5,584,178 A | * | 12/1996 | Naegeli et al. .................. | 60/303 |
| 6,240,732 B1 | * | 6/2001 | Allan .............................. | 60/739 |
| 6,357,219 B1 | * | 3/2002 | Dudd et al. ..................... | 60/790 |
| 6,644,009 B2 | * | 11/2003 | Myers, Jr. ................... | 60/39.091 |
| 6,945,053 B2 | * | 9/2005 | Von Der Bank ................ | 60/776 |
| 6,993,960 B2 | * | 2/2006 | Benson ....................... | 73/112.01 |
| 2002/0059799 A1 | | 5/2002 | Lavie et al. | |
| 2003/0217545 A1 | * | 11/2003 | Parsons et al. ............. | 60/39.281 |
| 2006/0162336 A1 | | 7/2006 | Cayre et al. | |
| 2007/0039329 A1 | * | 2/2007 | Abreu et al. .................... | 60/776 |

FOREIGN PATENT DOCUMENTS

| | | |
|---|---|---|
| EP | 1 209 338 A1 | 5/2002 |
| FR | 2 540 186 | 8/1984 |
| FR | 2 686 943 | 8/1993 |
| FR | 2 880 391 | 7/2006 |

* cited by examiner

*Primary Examiner* — Ehud Gartenberg  
*Assistant Examiner* — Michael B Mantyla  
(74) *Attorney, Agent, or Firm* — Oblon, Spivak, McClelland, Maier & Neustadt, L.L.P.

(57) ABSTRACT

The present invention relates to an annular combustion chamber of a gas turbine engine comprising a casing with at least one air tapping outlet situated at the chamber inlet, a fuel supply device with a plurality of fuel injectors in the chamber distributed annularly of which at least one is situated close to said tapping outlet.

The chamber is characterized in that the fuel supply device comprises a means for reducing the fuel flow rate in said injector situated close to the tapping outlet relative to the other fuel injectors.

Thanks to the invention, the hot spots downstream of the combustion chamber caused by the tappings are reduced.

9 Claims, 5 Drawing Sheets

ANNULAR COMBUSTION CHAMBER OF A GAS TURBINE ENGINE

The present invention relates to the field of gas turbine engines and its object is more particularly the operation of the combustion chambers in order to enhance notably the temperature profile at the outlet of the combustion chamber.

A gas turbine engine such as an engine producing propulsion gas of an aircraft comprises a means for compressing air which supplies a combustion chamber in which the air is mixed with a fuel and burned. The gases produced in the combustion chamber are guided through turbine rotors where they are expanded and then discharged. The turbines drive the various compressor rotors including the fan in a turbojet. In an aircraft, compressed air and power are tapped off in order to perform a plurality of auxiliary functions. In particular, air is tapped from the space situated immediately downstream of the compressed air diffuser opening into the combustion chamber.

The air is extracted through tapping outlets distributed on the casing of the combustion chamber in several locations in this annular space.

Nowadays the engine is allocated the function of supplying air to the aircraft over a wide operating range that is able to extend up to full throttle. This tapping has an effect on the quality of combustion.

Therefore, downstream of the chamber, the appearance of hot spots has been found. The analysis of the problem has shown that these zones of high temperature are situated downstream in the wake of the tapping outlets.

The phenomenon is associated with the distribution of the fuel injectors all around the axis. Specifically, the combustion in the annular chamber is divided into a plurality of seats of combustion situated in the extension of the fuel injectors. The fuel is injected upstream of the chamber by the injectors through openings in the bottom of the chamber and combustion results from the mixing of the air passing through these openings with the fuel. It has been noted that the tappings of air via the tapping outlets, because they are necessarily localized, had an effect on the quality of combustion in the seats situated downstream in the immediate environment of these tapping outlets. The air extracted through these tapping outlets is missing from the seat of combustion situated in the same zone. This results in an over-richness of fuel in these zones which leads to an increase in the temperature of the combustion gases, hence a nonuniform temperature profile noted downstream of the chamber.

The Applicant has set itself the objective of enhancing the temperature profile of the gas at the outlet of the combustion chamber and of reducing the hot spots that are harmful to the durability of the parts in this zone, the high-pressure guide vane elements in particular.

According to the invention, this objective is achieved with an annular combustion chamber of a gas turbine engine comprising a casing with at least one air tapping outlet situated at the chamber inlet, a fuel supply device with a plurality of fuel injectors in the chamber distributed annularly, at least one injector being situated close to said tapping outlet, wherein the fuel supply device comprises a means for reducing the fuel flow rate in said injector situated close to the tapping outlet, relative to the other fuel injectors.

The advantages of the solution of the invention are that, with a simple means, it is possible to achieve a uniformity in the fuel richness over the whole combustion chamber. This results in a limitation of the wakes found and an improvement in the temperature map at full throttle. The consequence thereof is an enhancement in the service life of the high-pressure guide vane elements immediately downstream of the combustion chamber.

According to another feature, the means for reducing the fuel flow rate is arranged in order to reduce the fuel flow rate in the injector situated close to the air tapping outlet by 3 to 10% relative to the other injectors.

According to one embodiment, said flow rate reduction means is a diaphragm in the supply duct of the injector.

According to another embodiment, the fuel injectors comprise an idle supply and a full throttle supply with a means for controlling the flow rate in the full throttle supply, the flow rate reducing means being arranged to act on said control means.

More particularly, the control means is a valve returned by a spring, the flow rate reducing means being formed by a spring of determined stiffness.

According to another embodiment, the supply device comprises a manifold to which the individual supply ducts of the injectors are connected, the supply duct of the injector close to the tapping outlet being controlled by a gate whose position is determined so as to reduce the flow rate relative to the other injectors.

Other features and advantages will emerge on reading the following description of nonlimiting embodiments of the invention with reference to the drawings, in which FIG. 1 represents a combustion chamber of a gas turbine engine seen in axial half-section;

Figure 1:
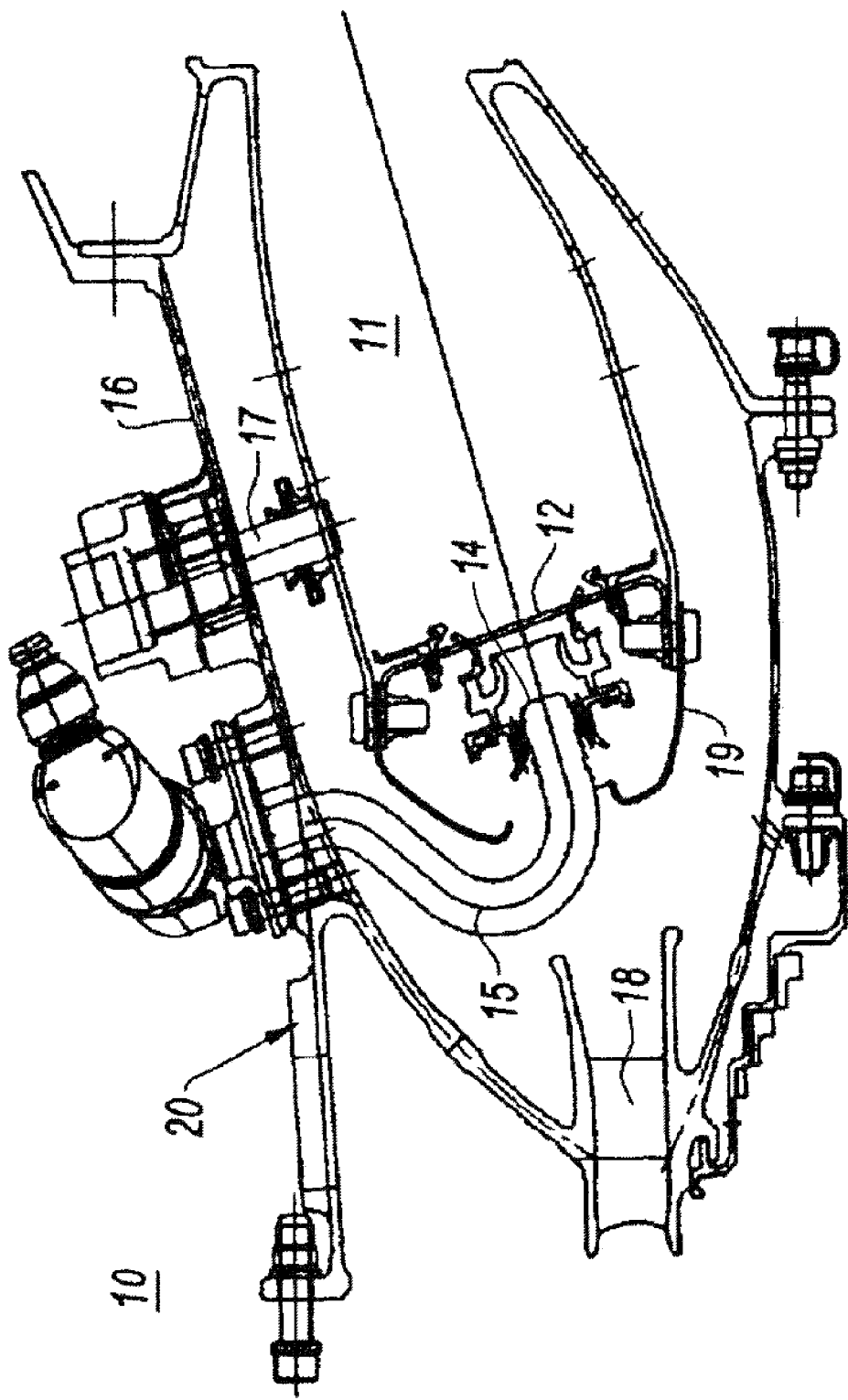

FIG. 1 partially represents in half-section a combustion chamber 11 of an aircraft turbojet 10. The combustion chamber with a generally annular geometry comprises a chamber bottom 12 provided with orifices inside which are engaged to the spray heads 14 of a certain number of injectors 15 supported by a casing 16 surrounding the combustion chamber. The injectors 15 are evenly spaced circumferentially. The compressed air, originating from the high-pressure compressor situated upstream, not visible, is introduced into the casing by an annular diffuser 18. The hot air is divided into two streams by guide metal sheets 19 covering the chamber bottom 12; one strip passes through the casing 16 travelling round the combustion chamber 11 before being inserted therein in its downstream portion and the other enters the combustion chamber through openings between the guide metal sheets and the orifices in the chamber bottom 12 in order to mix with the fuel sprayed by the spray heads 14 into the combustion chamber. The fuel ignites in contact with a spark plug 17 situated in the angle of the fuel spray cone in order to provide gases supplying a high-pressure turbine situated downstream and not shown. Each injector 15 comprises an injector arm, supporting and supplying the spray head 14. The arm is bent so as to keep the spray head in position perpendicular to the chamber bottom. In the context of the combustion chamber to which the invention applies, air tapping outlets 20 are arranged in the casing 16. The air tapping outlets communicate with the annular zone situated between the diffuser 18 and the guide metal sheets 19.

Figure 2:
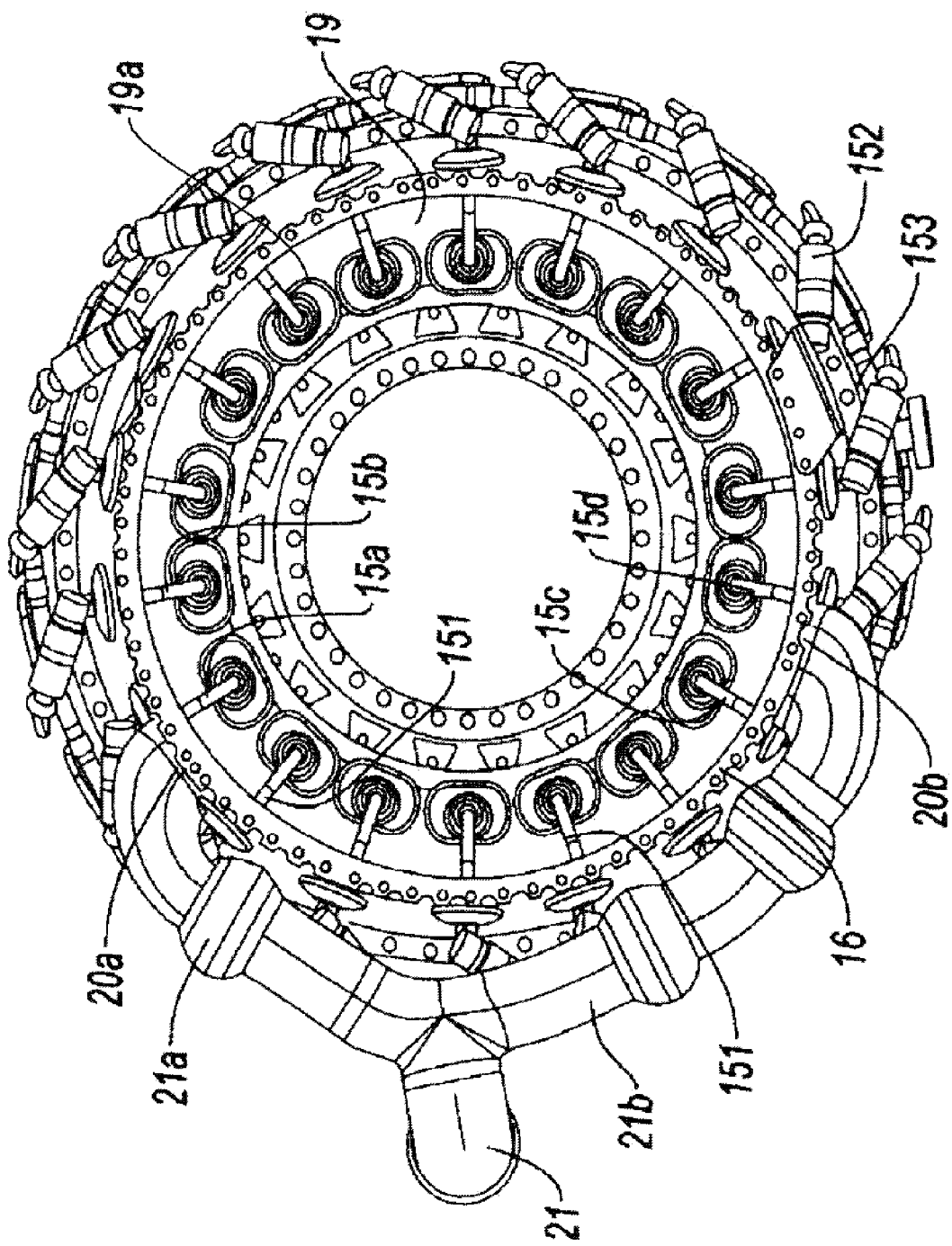
FIG. 2 represents an annular combustion chamber seen from the air inlet in the downstream direction relative to the flow of the gases.

With reference to FIG. 2, the combustion chamber is seen in the axis of the engine from upstream to downstream relative to the direction of flow of the gases. The injectors 15 are distributed evenly around the chamber. In this instance they take the form of tubes 151 connected by individual flow rate regulators 152 to an annular duct 153 distributing the fuel in the various injector supply tubes 152. The injectors are engaged in individual openings through the metal sheets 19 in order to supply the inside of the combustion chamber. This figure shows the tapping tube 21 comprising two portions of tube 21a and 21b that are each connected to a tapping outlet 20a respectively 20b, both arranged on the casing of the combustion chamber. The two portions of tube meet at a tube 21 which guides the extracted air toward the various zones of use.

This figure clearly shows that the two outlets 20a and 20b are placed immediately upstream of a portion of the injectors. In this instance they are the injectors 15a and 15b on the one hand and injectors 15c and 15d on the other hand. The air originating from the diffuser 18 forms an annular stream which is subdivided into elementary streams which enter each of the openings 19a of the fairing 19 at the entrance of the chamber 11 and with which the injectors 15 are linked. In operation, the fuel supplied by each of the injectors is mixed with the elementary streams in order to form the same number of seats of combustion distributed annularly.

Because the injectors are all supplied in the same manner from the main supply circuit, the quality of combustion in each of the seats depends on the ratio of the fuel flow rates to the elementary air flow rates. In particular, the tapping of air through the extraction outlets 20a and 20b causes a change in the ratio of air to fuel downstream of the injectors 15a, 15b and 15c, 15d. The excessive richness in fuel which results therefrom is reflected in the seats of combustion associated with these injectors by a temperature of the combustion gases that is higher than in the other seats. The result of this is an annular temperature profile downstream of the combustion chamber that has hotter spots.

According to the invention, this problem is solved by reducing the fuel supply in the above injectors so as to return to an air-to-fuel ratio equal to that of the other seats.

The means for achieving this are adapted to the injection means.

In a known manner, the injectors supply the combustion chamber with fuel during startup and normal operation of the engine. Principally, there are two types of injectors: "aeromechanical" injectors designed for two fuel circuits (primary and secondary) depending on the operating phases of the engine (ignition, from low to full power), and "aerodynamic" injectors which have only one fuel circuit for all the phases of operation.

Figure 3:
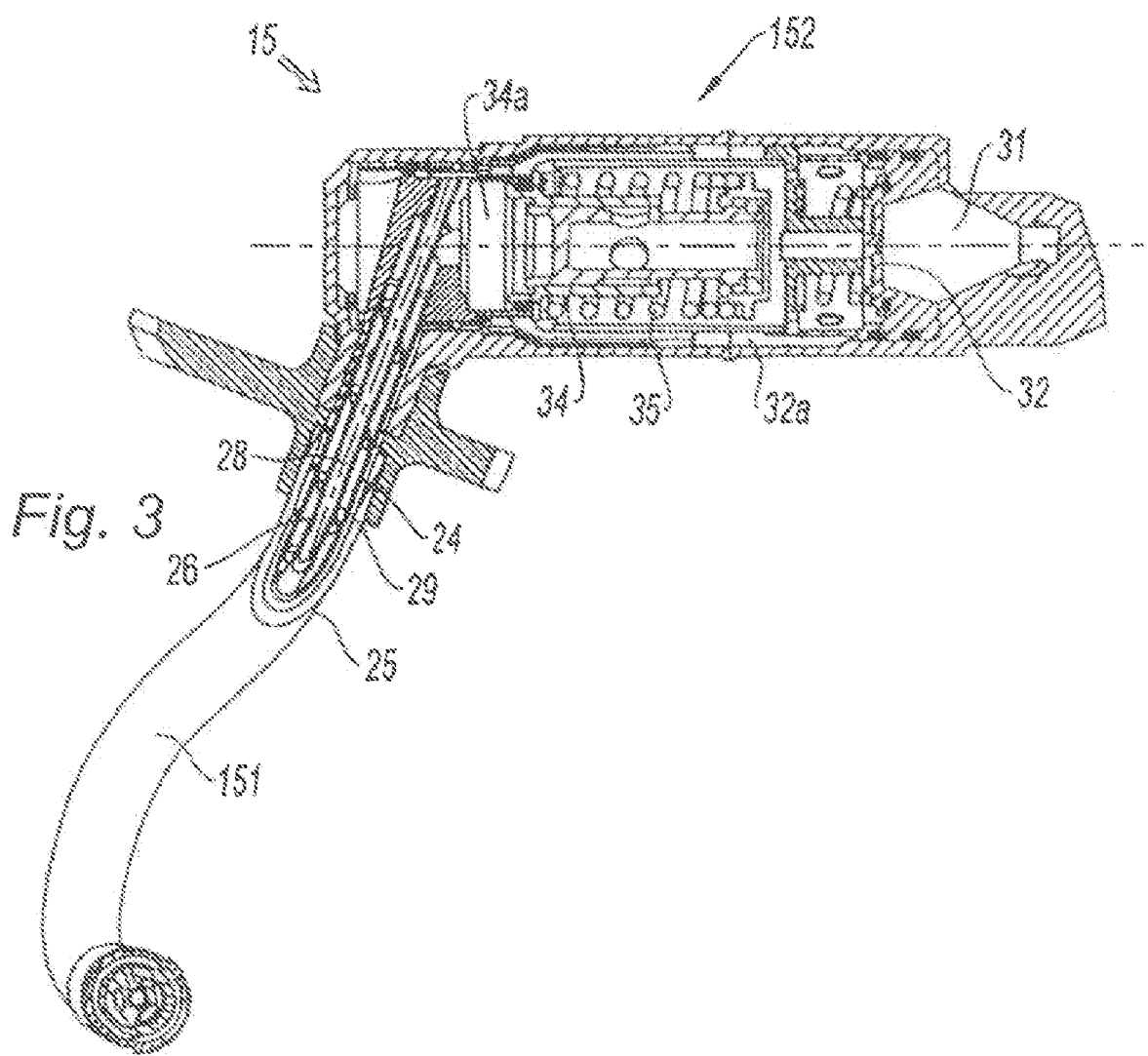
FIG. 3 represents an injector of the aeromechanical type with two parallel fuel supply ducts.

In the case of an aeromechanical device, with a double jet, the injector comprises an arm fixed to the casing of the combustion chamber and terminating in a spray head. An example of an aeromechanical injection device is shown in FIG. 3. Each arm 151 comprises two tubes, for example as in the device described in patent EP1770333, in the name of the Applicant, a first, outer tube 24 surrounded by a protective casing 25 and a second, inner, tube 26 engaged coaxially in the outer tube in order to define two coaxial ducts, a central duct 28 delimited by said inner tube and a peripheral duct 29 with an annular cross section surrounding the central duct and delimited by the two tubes, the inner tube 26 and outer tube 24. Each injector arm 151 is connected to two fuel supply circuits making it possible to adapt the supply conditions to the various engine speeds. There are a primary fuel circuit for operation at idle speed and at low power whose flow rate is low and unchanging, irrespective of the operating conditions of the engine, and a secondary fuel circuit with a flow rate that is essentially variable from low and even zero to maximum.

The two fuel ducts 28 and 29 are therefore connected for example to a metering device 152 of the type described in patent FR 2540186 or else EP 1209338.

The fuel is supplied under pressure by a pump to the device 152 via a fuel inlet coupling 31. This coupling communicates with a stop valve 32 which opens when the fuel pressure exceeds a first threshold and which remains open during the operation of the engine. Downstream of the stop valve, the fuel is constantly guided through the passageway 32a to the first duct 28 up to the spray head. Another portion of the fuel, forming the secondary flow, is controlled by a metering valve. The secondary flow is therefore controlled by the metering valve 34 downstream of the stop valve 32 and designed to open and meter the fuel beginning at a pressure that is higher than the first threshold. The fuel is guided downstream of the valve 34 through the passageway 34a up to the duct 29 from where it is directed toward the spray head. The valve 34 opens under the effect of the fuel pressure against the return force of the spring 35.

In the solutions of the prior art, the object has been to regulate the secondary fuel metering valve so that the fuel flow rates are as close as possible in all the injectors of the same combustion chamber. According to the invention, the adjustment of the metering valves associated with the injectors 15a to 15d is modified so that their flow rate is lower than a determined value, notably between 3% and 10% relative to that of the other injectors of the combustion chamber. By reducing the flow rate, the richness of the fuel mixture is reduced in the seats of combustion situated in the environment of the air extraction outlets.

The means of adjusting the metering valves 34 consists in an adjustment of the springs 35 that are associated therewith.

Figure 4:
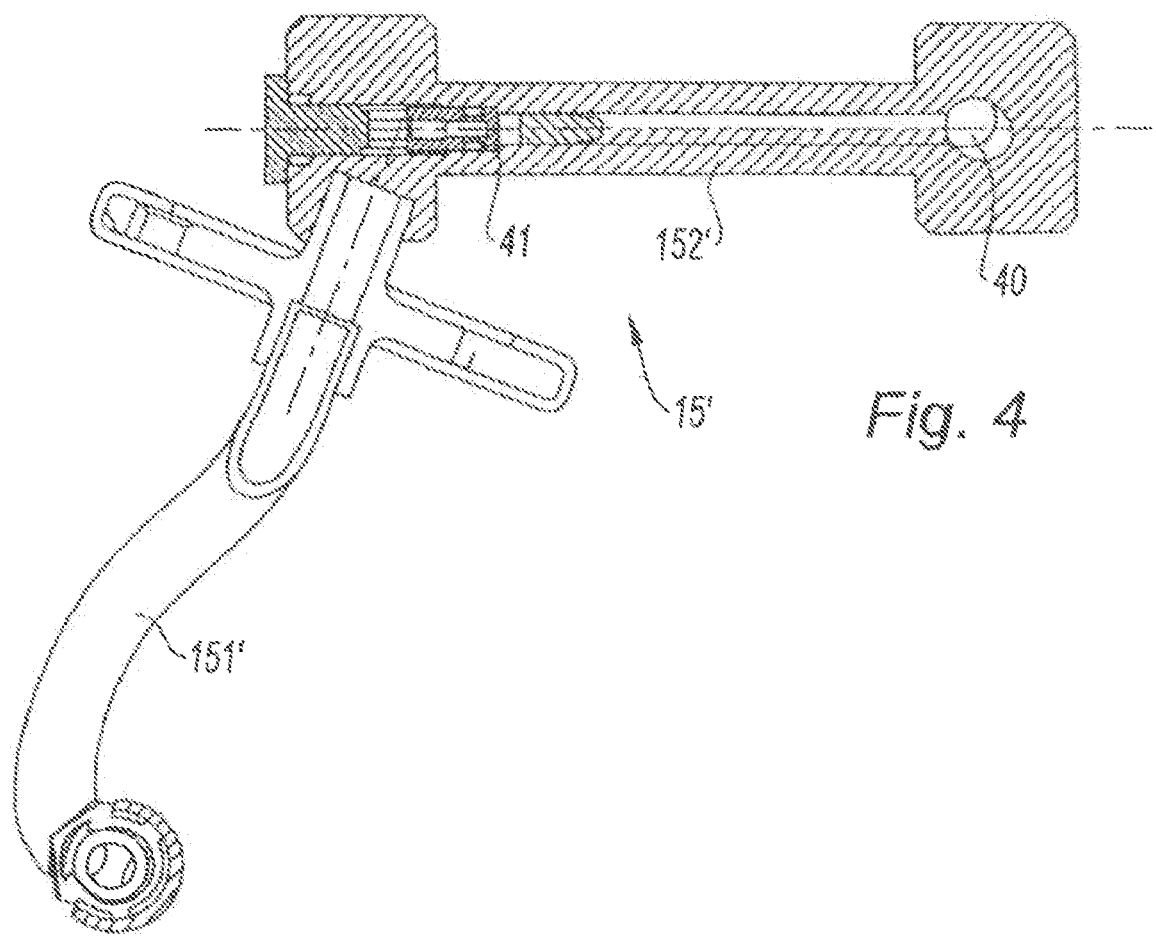
FIG. 4 represents an injector with a single fuel supply duct.

An injector of the aerodynamic type 15' such as that represented in FIG. 4 is supplied notably through a metering valve arranged to open under a predetermined fuel supply pressure and remain open in response to an increase in this supply pressure in order to allow the fuel to be taken in and then discharged toward the injector nozzle where the fuel is diffused in the combustion chamber.

In the channel 152' for supplying the injector arms 151', a fixed diaphragm calibrates the flow rate. These diaphragms in the conventional embodiments are identical so as to supply the various injectors with one and the same flow rate. Such a diaphragm is represented in FIG. 4. The single-tube injector arm 15' is connected to the fuel supply circuit metered via a coupling 40 which comprises a diaphragm 41 with a calibrating cross section. According to the invention, the Applicant has chosen a diaphragm with an appropriate calibrating cross section so that the flow rate of the injectors 15'a to 15'd the position of which corresponding to 15a to 15d of FIG. 2 is less than that of the other injectors.

According to a variant embodiment of the invention, the fuel injectors 15a to 15d or 15'a to 15'd are supplied by circuits separate from those of the other injectors that are controlled by a solenoid valve or else an adjustable gate.

Figure 5:
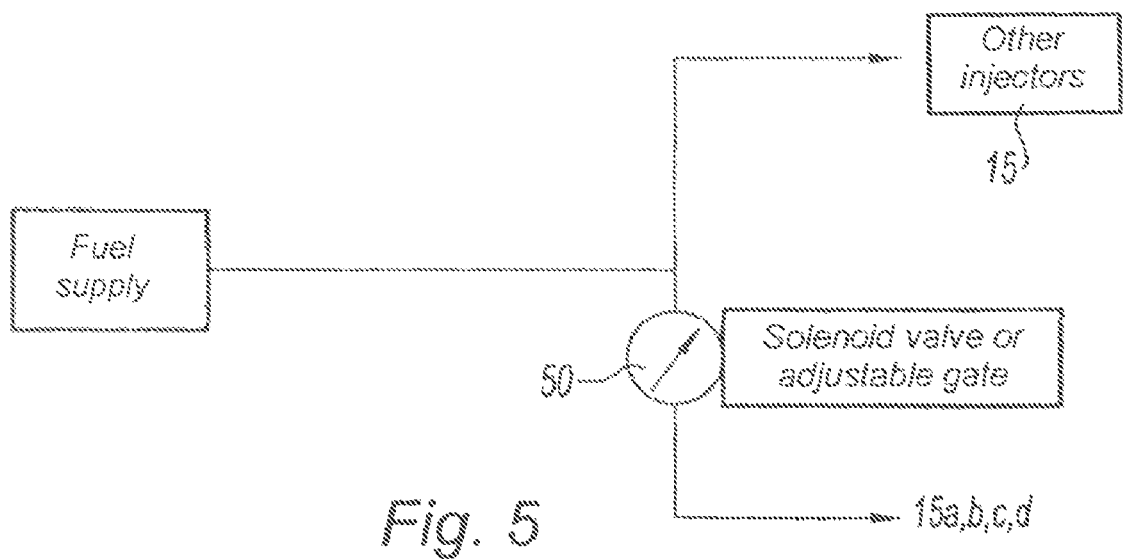
FIG. 5 shows a variant embodiment of the invention.

As can be seen in FIG. 5, the fuel circuit supplying the injectors 15a to 15d is controlled by a solenoid valve or a gate 50. The solenoid valve adopts two possible positions: an open position and a position with a reduced passageway in order to create a pressure drop in the corresponding circuit. When there is no tapping of air through the tapping outlets, the solenoid valve is open. All the injectors operate in the same manner. When tapping takes place, the solenoid valve is in the position to create a pressure drop in the circuit supplying the injectors 15a to 15d. Through this pressure drop, the flow rate to the injectors in question is reduced.

If the law regulating the tapping operation is more complex, an adjustable gate is installed and regulated according to the air tapping flow rate in order to optimize the uniformity in the richness of the injectors throughout the whole flight domain.

The examples shown are not limiting; other variant embodiments are possible. Therefore the invention is not limited to the tapping through two outlets on the casing; other arrangements are possible.

The invention claimed is:

1. An annular combustion chamber of a gas turbine engine comprising a casing with at least one air tapping outlet situated at the chamber inlet, a fuel supply device with a plurality of fuel injectors in the chamber distributed annularly of which at least one is situated closer to said tapping outlet, wherein the fuel supply device comprises a means for reducing the fuel flow rate in said injector situated closer to the tapping outlet relative to the other fuel injectors.

2. The combustion chamber as claimed in claim 1, wherein said means for reducing the fuel flow rate is arranged in order to reduce the fuel flow rate in said injector situated close to the air tapping outlet by 3 to 10% relative to the other injectors.

3. The combustion chamber as claimed in claim 1, wherein said flow rate reduction means is a fixed diaphragm in the supply duct of the injector.

4. The combustion chamber as claimed in claim 1, wherein the fuel injectors comprise an idle supply and a full throttle supply with a means for controlling the flow rate in the full throttle supply, the flow rate reducing means being arranged to act on said control means.

5. The combustion chamber as claimed in claim 4, wherein the control means is a valve returned by a spring, the flow rate reducing means being formed by a spring of determined stiffness.

6. The combustion chamber as claimed in claim 1, wherein the supply device comprises a manifold to which the individual supply ducts of the injectors are connected, the supply duct of said injector close to the tapping outlet being controlled by a gate whose position is determined so as to reduce the flow rate relative to the other injectors.

7. The combustion chamber as claimed in claim 6, wherein the gate is a solenoid valve.

8. The combustion chamber as claimed in claim 6, wherein the gate is regulated according to the air tapping flow rate.

9. A gas turbine engine comprising a combustion chamber as claimed as in one of claims 1-8.

* * * * *